United States Patent [19]

Kennedy et al.

[11] 4,036,396
[45] July 19, 1977

[54] WEATHERPROOF JUNCTION BOX COVER ASSEMBLY

[75] Inventors: Richard T. Kennedy, Oaklawn; Algird R. Quitschau, Downers Grove; Ernest S. Kettelson, Joliet, all of Ill.

[73] Assignee: Square D Company, Park Ridge, Ill.

[21] Appl. No.: 621,906

[22] Filed: Oct. 14, 1975

[51] Int. Cl.² ........................................ H02G 3/18
[52] U.S. Cl. ............................. 220/242; 174/67; 220/335
[58] Field of Search .............. 220/3.8, 241, 242, 334, 220/335, 348; 174/53, 58, 66, 67; 206/266; 339/44 R, 44 M

[56] References Cited

U.S. PATENT DOCUMENTS

| | | | |
|---|---|---|---|
| 1,591,510 | 7/1926 | Bushnell | 220/334 X |
| 1,990,189 | 2/1935 | King | 220/334 X |
| 2,316,302 | 4/1943 | Van Dyk et al. | 220/335 |
| 3,140,344 | 7/1964 | Slater et al. | 174/67 |
| 3,200,989 | 8/1965 | Hubbell | 220/242 |
| 3,229,846 | 1/1966 | Katz | 220/334 X |
| 3,686,425 | 8/1972 | Zerwes et al. | 174/67 X |

Primary Examiner—Stephen Marcus
Attorney, Agent, or Firm—Harold J. Rathbun; Ernest S. Kettelson

[57] ABSTRACT

A weatherproof junction box cover assembly, comprising a structural member for mounting relationship with a junction box and a cover hingedly mounted on the structural member with cooperative inter-acting hood means at the top and sides of the cover assembly. A shiftable bias means is provided to normally bias the cover toward a closing position, the bias means being shiftable between an over-center station in relation to the pivot means whereby the cover will stay open when moved to the fully open position and a direct-closing-bias station whereby the cover will be constantly biased toward the closing position. The same cover assembly may therefore be used as a stay-open device or as a self-closing device, merely by shifting the anchor point of the bias means.

2 Claims, 11 Drawing Figures

WEATHERPROOF JUNCTION BOX COVER ASSEMBLY

BACKGROUND OF THE INVENTION

This invention relates to the field of electrical junction box covers, and particularly to those which provide a rain tight covering for electrical outlets or other devices mounted in a junction box exposed to the weather.

An example of a previous device in this field is the cover and junction box assembly described in U.S. Pat. No. 3,686,425, assigned to the assignee of the present invention. That patent discloses a hooded, spring loaded cover pivotally mounted with respect to a junction box for movement between an open and closed position. The cover in such existing device will operate in only one mode, namely the stay-open mode. In other words, when the cover is moved to the fully open position it will stay open because the anchor points of the spring move over center when the cover is fully open. Other known covers for junction boxes operate in the self-closing mode, but only in that mode. Electrical contractors and suppliers must accordingly stock two different types of covers in order to satisfy both requirements, and heretofore an outlet could not be changed from a stay-open to a self-closing use without removing one type of cover and re-installing the different type.

The cover assembly in accordance with the present invention includes shiftable biasing means to enable use of the same cover in the stay-open mode and also in the self-closing mode. In addition, the slotted guideways for the pivot means are concealed and protected from the weather in the present invention, thus improving its rain tight characteristics. In existing previously known devices the corresponding slots are exposed, making it possible for some rain, sleet or snow to enter the slots.

SUMMARY OF THE INVENTION

It is an object of the invention to provide a rain tight weatherproof cover assembly for electrical junction boxes, comprising a structural mounting member for mounting relationship with a junction box and a cover hingedly mounted on the structural member, the structural member and cover having cooperating interacting hood means at the top and sides.

It is an object of the invention to provide a rain tight weatherproof cover assembly for electrical junction boxes, including shiftable bias means to bias the cover toward a closing position and operable in either a stay-open mode or a self-closing mode by shifting the bias means from one anchor point to a second anchor point.

It is an object of the invention to provide a rain tight weather proof cover assembly for electrical junction boxes, including enclosed pivot means and enclosed slotted guideways for such pivot means to protect from the weather and thus improve the rain tight weatherproof characteristics of the device.

DESCRIPTION OF PREFERRED EMBODIMENT

Figure 1:
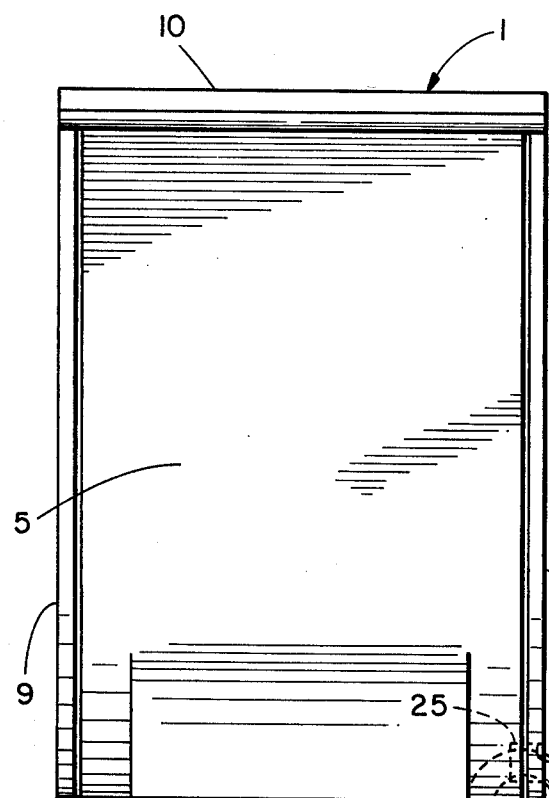
FIG. 1 is a front elevation view of a junction box cover assembly in fully closed position.
Figure 2:
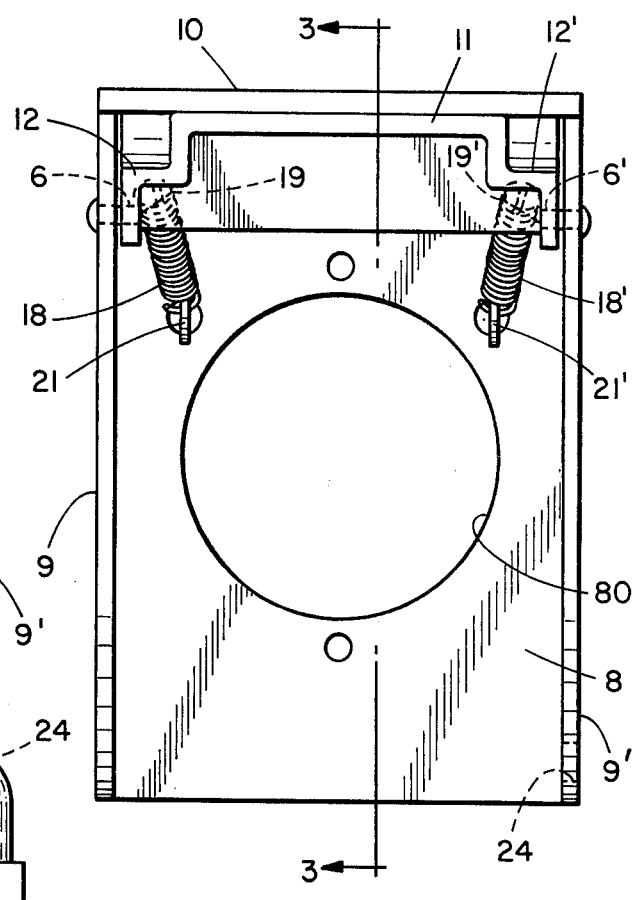
FIG. 2 is a front elevation view of the junction box cover assembly in fully open position.
Figure 3:
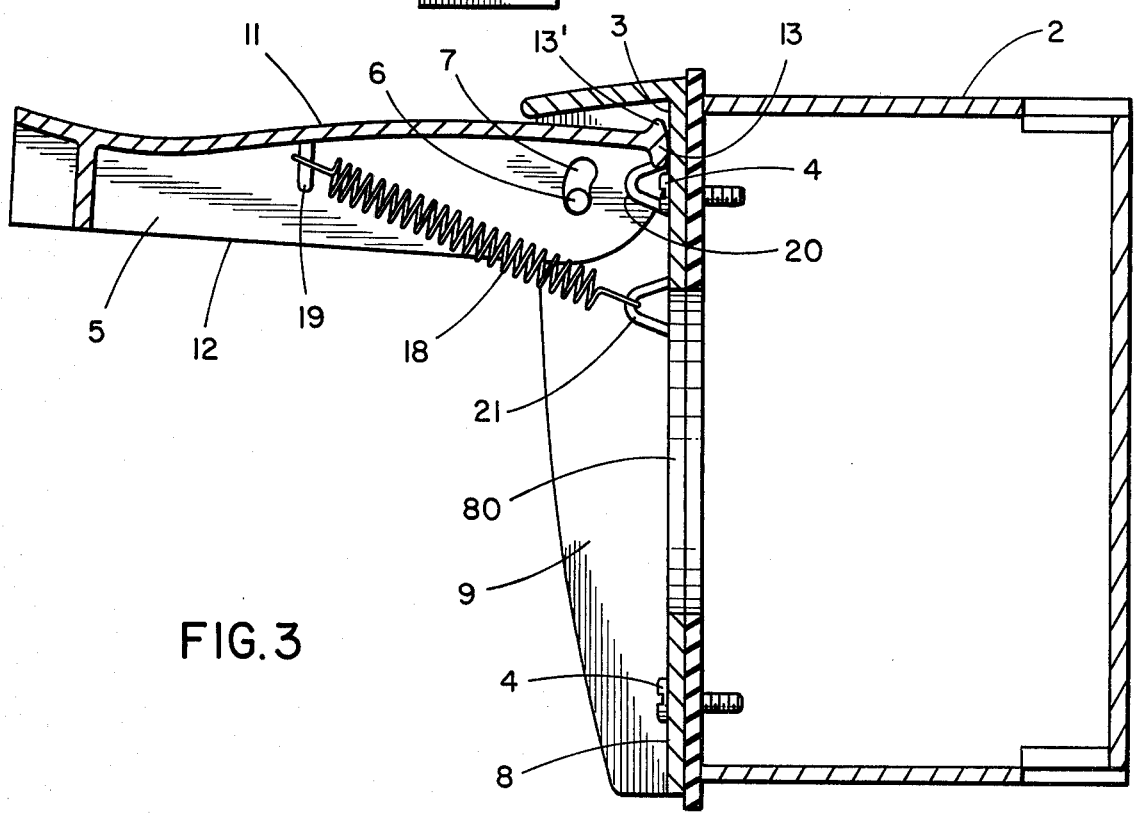
FIG. 3 is a section view taken on line 3—3 of FIG. 2 showing the cover assembly attached to a junction box.
Figure 4:
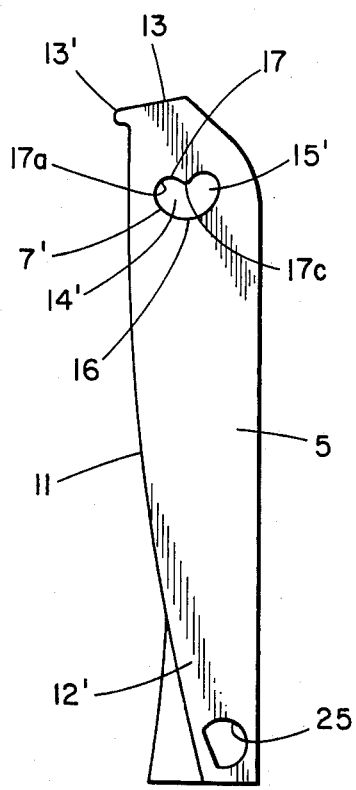
FIG. 4 is a side elevation view of the cover member of the cover assembly in accordance with this invention.
Figure 5:
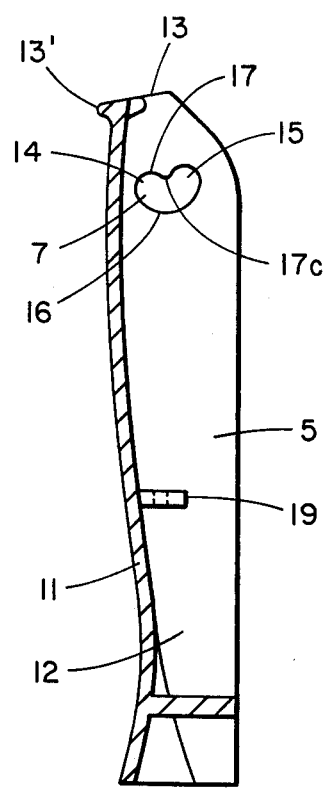
FIG. 5 is a section view of the cover member shown in FIG. 4.
Figure 6:
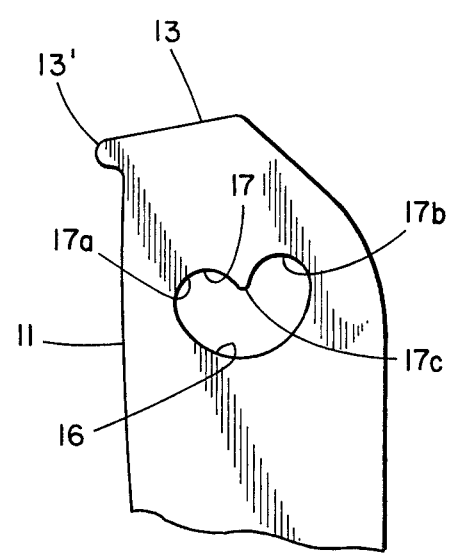
FIG. 6 is an enlarged segment of the cover member shown in FIG. 4.

A cover assembly 1 is provided for attachment to a junction box 2 to protect the box and an electrical device therein from the weather.

The cover assembly includes a structural mounting member 3 which may be secured to junction box 2 by means of screws 4. A cover member 5 is hingedly mounted on structural member 3 by means of trunnions or pivot posts 6 and 6' received in slotted guideways 7 and 7'.

The structural member 3 includes a hood means projecting outwardly from peripheral portions of base plate 8, and comprising side walls 9 and 9' plus top wall 10. The side walls, top wall and base plate 8 are preferably integrally formed to provide improved waterproof and weatherproof qualities. Aperture means 80 are provided in base plate 8 for access to the junction box 2 and an electrical device installed therein.

The cover includes cooperative inter-acting hood means projecting inwardly from peripheral portions of the front cover wall 11 towards base plate 8 of the structural member 3 when the cover 5 is mounted thereon. The inter-acting hood means of the cover comprises side cover walls 12 and 12' and top cover wall 13. The top cover wall 13 includes a projecting lip portion 13' which projects forwardly and outwardly a slight ditance from the outer surface of imperforate front cover wall 11.

The trunnions 6 and 6' are mounted respectively on the side walls 9 and 9' of structural member 3, projecting from the inner facing surfaces thereof and facing each other in axial alignment, located inwardly from the free edges of side walls 9 and 9' a first preselected distance, and downwardly from the top edge of said side walls a second preselected distance.

The said trunnions 6 and 6' are received in guideways comprising arcrate slots 7 and 7' formed respectively in the side cover walls 12 and 12'. The acurate slot guideways 7 and 7' have respective first terminal positions 14 and 14' at one end of the respective guideways and second terminal positions 15 and 15' at the opposite end thereof. The centers of the first terminal positions 14 and 14' are spaced inwardly from the surface of the front cover wall 11 a distance corresponding to the aforesaid first preselected distance which the trunnions are spaced inwardly from the free edges of side walls 9 and 9' of structural member 3, and downwardly from the top cover wall 13 a distance corresponding to the said second preselected distance of said trunnions from the top edge of side walls 9 and 9', whereby when said front cover wall 11 is in the closed position, said trunnions 6 and 6' are in the first terminal positions 14 and 14' of respective arcuate slot guideways 7 and 7'.

The centers of second terminal positions 15 and 15' are spaced inwardly from the surface of front cover wall 11 a distance corresponding to the aforesaid second preselected distance (i.e. the distance of the trunnions from the top edge of the side walls 9 and 9') and downwardly from the top cover wall 13 a distance corresponding to that between base plate 8 and trunnions 6 and 6'. Thus, when said front cover wall 11 is in the fully opened position, said trunnions 6 and 6' are in the second terminal positions 15 and 15'.

The said first and second terminal positions of arcuate guideways 7 and 7' are in open communication through the arcuate slots bounded by border wall 16 which is concave facing into said slotted guideway and on the opposite side by slot border wall 17 which includes two segments 17a and 17b, each of which is concave facing into the slotted guideway. The inward extending and adjacent ends of border wall segments 17a and 17b are joined at projecting point 17c, midway between said first and second terminal positions.

The said first preselected distance which the centers of trunnions 6 and 6' are spaced inwardly from the free edges of side walls 9 and 9' is chosen to be substantially equal to the distance between the outer facing surface of front cover wall 11 and the centers of said first terminal positons 14 and 14' of arcuate slot guideways 7 and 7'. The said second preselected distance which said trunnions are spaced downwardly from the top edges of side walls 9 and 9' is chosen to be substantially equal to the distance between the outer facing surface of front cover wall 11 and the centers of said second terminal positions 15 and 15' of said arcuate slot guideways 7 and 7'.

In this manner, the outer facing surface of front cover wall 11 is substantially flush with the free edges of side walls 9 and 9' of structural mounting member 3 when the cover 5 is in the fully closed position and the trunnions are seated in the first terminal positions 14 and 14' of said arcuate guideways 7 and 7'. Similarly, when the cover 5 is in the fully open positon and the trunnions are seated in the second terminal positions 15 and 15', the outer facing surface of front cover 11 abuts against the top wall 10 of structural mounting member 3.

In such fully open position, the trunnions 6 and 6' seated respectively in second terminal positions 15 and 15' abut against segments 17b of the slot border wall and projecting point 17c. The concave surface of segment 17b and projecting point 17c form an enveloping pocket in which trunnions 6 and 6' are resiliently locked when the biasing means of this invention is anchored in the stay-open position as described below and the cover is in the fully open position.

Biasing means are provided to normally bias the cover member 5 toward a closing position, which includes two coiled springs 18 and 18'. A first pair of anchor lugs 19 and 19' are formed on the inner surfaces of side cover walls 12 and 12' near their respective junction with the inner surface of front cover wall 11, and spaced intermediately between the top cover wall 13 and the bottom edge of the cover member 5, preferably at a point closer to the bottom edge than to the top.

A second pair of anchor lugs 20 and 20', and a third pair of anchor lugs 21 and 21' are provided on the base plate 8 of structural mounting member 3. The said second pair of anchor lugs 20 and 20' are positioned on said base plate 8 a relatively short distance downward from top wall 10 at a point whereby a straight line between respective corresponding anchor lugs of said first pair (on the cover) and said second pair (on the base plate) lies above said trunnions when the cover member 5 is in fully open position.

The said third pair of anchor lugs 21 and 21' are positioned on said base plate 8 a relatively greater distance downward from top wall 10 at a point whereby a straight line between respective corresponding anchor lugs of said first pair (on the cover) and said third pair (on the base plate) lies below said trunnions when the cover member is in fully open position.

By virtue of this construction, when the springs 18 and 18' are anchored respectively between said first pair of anchor lugs (19 and 19') and said second pair (20 and 20'), the cover member 5 is biased in the stay-open position when it is moved to the fully open position since the springs 18 and 18' are extended on a straight line above the trunnions or pivot posts, or over-center.

However, when the springs 18 and 18' are anchored respectively between said first pair of anchor lugs 19 and 19' on the cover, and said third pair of anchor lugs 21 and 21' on the base plate, the cover member 5 is continuously biased in the self-closing mode toward a closing position. Even when in the fully open position, the springs 18 and 18' are extended on a straight line below the trunnions or pivot posts so the bias of the spring on the cover 5 is continuously toward the fully closed position.

The arcuate ends 18a and 18a' of said springs may be readily removed from either of said second and third pairs of anchor lugs and anchored in the other of said pairs, to change the cover assembly 1 from the stay-open mode of operation to the self-closing mode and vice versa.

Figures 9, 10:
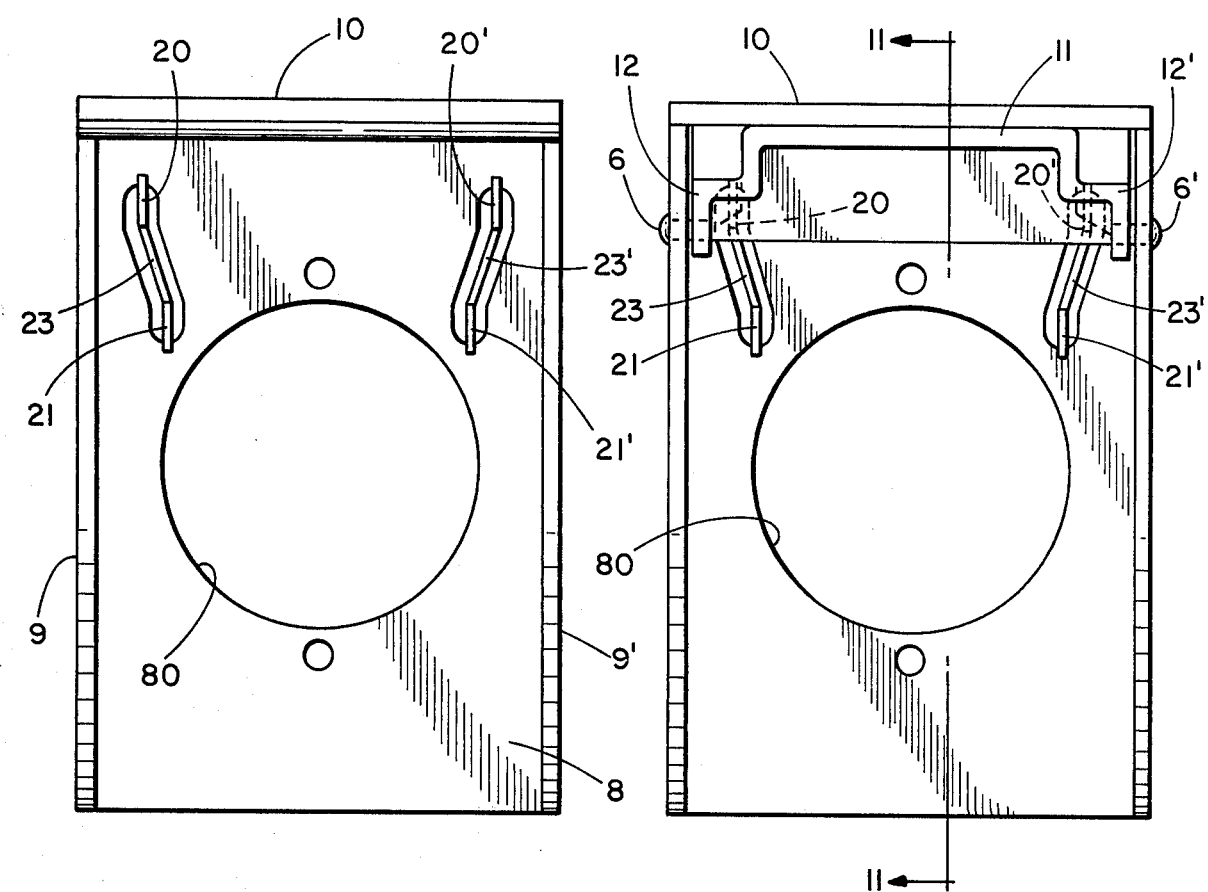
FIG. 9 is a front elevation view of a modified structural mounting member of the cover assembly, with the cover member removed.
FIG. 10 is a front elevation view of the modified cover assembly of FIG. 9, but with the cover member attached and in fully open position.
Figure 11:
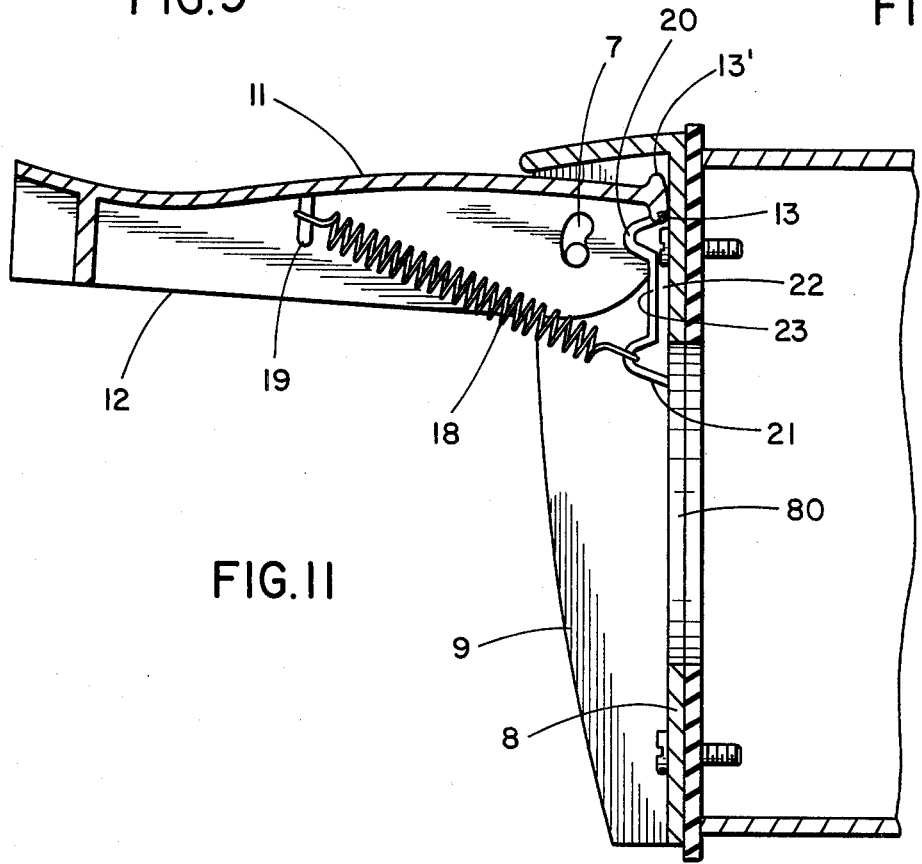
FIG. 11 is a section view taken on line 11—11 of FIG. 10.

In the modification shown in FIGS. 9-11, the second pair of anchor lugs 20 and 20' and third pair of anchor lugs 21 and 21' are interconnected by channels 22 and 22' (see FIG. 11) formed between interconnecting guide rails 23 and 23' and the underlying surface of base plate 8. To change from the stay-open mode to the self-closing mode, the arcuate ends 18a and 18a' anchored in the second pair of lugs 20 and 20' respectively are merely pushed downward into channels 22 and 22' and across to the third pair of anchor lugs 21 and 21'. To change back to the stay-open mode, the procedure is simply reversed.

The cooperative interacting hood means of the structural mounting member 3 and of the cover member 5, are illustrated in the drawings with side walls 9 and 9' of member 3 outside of the side cover walls 12 and 12' when in closed position. However, the invention contemplates and includes equivalent structure wherein the relationship is reversed and the peripheral walls of the cover member lie outside the corresponding walls of the structural mounting member.

Figure 7:
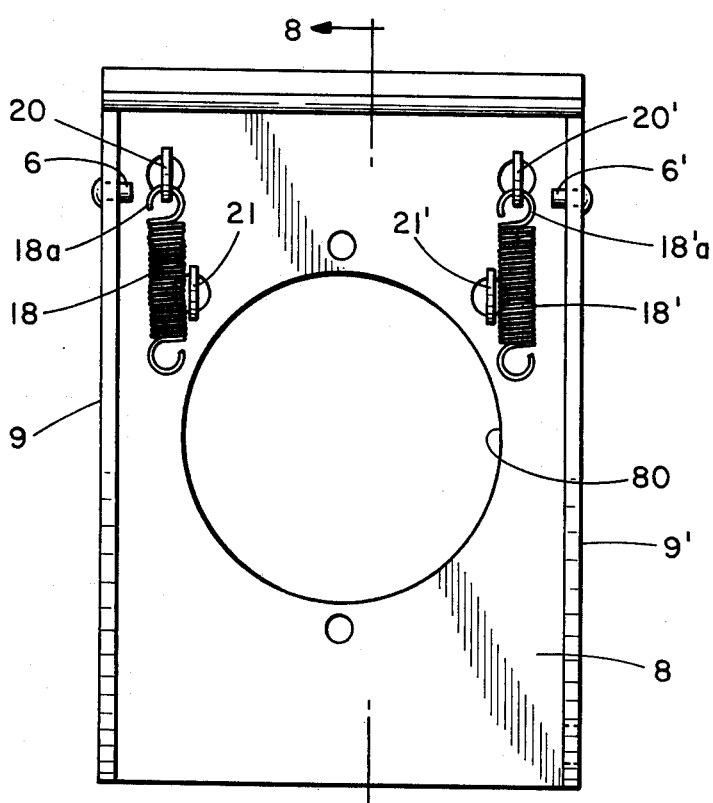
FIG. 7 is a front elevation view of the structural mounting member of the cover assembly, with the cover member removed.
Figure 8:
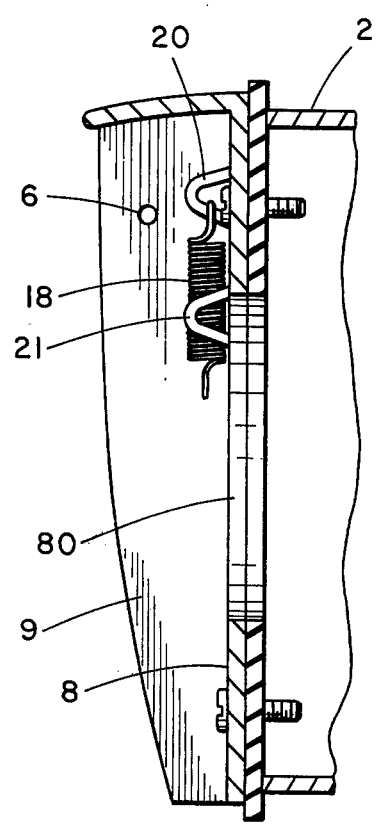
FIG. 8 is a section view taken on line 8—8 of FIG. 7.

The third pair of anchor lugs 21 and 21' may be inset on base plate 8 from the respective side edges a relatively greater distance than the second pair of anchor lugs 20 and 20', to enable springs 18 and 18' when anchored in the second pair of lugs 20 and 20' to clear the third pair 21 and 21' when the cover is in the fully closed position. This construction enables springs 18 and 18' to move unimpeded toward a position adjacent base plate 8 when in the fully closed position and continue to bias cover member 5 toward the closing position until fully closed. FIG. 7 illustrates this relative positioning of the anchor lugs 20-20' and 21-21' whereby springs 18-18' are able to clear lugs 21-21' when anchored in lug 20-20' and moved to a cover-closed position.

Lock receiving means is provided for the cover assembly, including an aperture 24 formed through the lower portion of side wall 9' of structural mounting member 3, and a corresponding opening 25 formed through the lower portion of side cover wall 12' which registers with aperture 24 when the cover 5 is in fully closed position. A padlock 26 may be secured in place through aperture 24 and opening 25 and locked to prevent unauthorized opening of the junction box cover assembly in accordance with this invention.

We claim:

1. A weatherproof junction box cover assembly, comprising a structural member for mounting relationship with a junction box, a cover member, pivot means associated with said members to hingedly mount said cover member on said structural member, a cooperative interrelated hood associated with said structural member and said cover member, shiftable bias means operably mounted on said assembly to normally bias said cover toward a closing position, said shiftable bias means being shiftable with respect to such members to vary the operative effect of said bias means, wherein said shiftable biasing means includes a spring to normally bias said cover toward a closing position, said spring including shiftable interconnecting means to shift the operation of said cover from a first mode to a second mode, mounting means on said cover assembly, said shiftable interconnecting means being shiftably connectable to said mounting means of said assembly, said mounting means including first mounting means having first and second connecting stations positioned on one of said members for connection of said shiftable interconnecting means of said spring thereto and dis-connection therefrom, said first connecting station being spaced apart from said second connecting station on said one of said members, a second interconnecting means of said spring located oppositely of said shiftable interconnecting means, second mounting means of said assembly on the other of said members spaced apart from said first mounting means in the direction said cover member moves when opening, said second interconnecting means of said spring being connectible to said second mounting means, said shiftable interconnecting means including a first end providing means for connection to and disconnection from said first mounting means, said pivot means defining a pivotal axis directed perpendicular to the direction of opening and closing of said cover member and located intermediately of said first and second mounting means, a straight line between said first mounting means and said second mounting means lying on a first side of said pivotal axis when said cover member is in the fully open position, a straight line between said second pair of lugs of said first mounting means and said second mounting means lying on an opposite second side of said pivotal axis when said cover member is in the fully open position.

2. A weatherproof junction box cover assembly as set forth in claim 1, wherein said first connecting station of said first mounting means includes a first lug, said second connecting station of said first mounting includes a second lug, interconnecting means between said first and second lug, said first and second lugs each defining an anchoring cavity bounded by rib means for anchoring said first end of said spring, said anchoring cavity of each lug being open to said interconnecting means in communication between said first and second lugs, said interconnecting means including interconnecting rib means extending between said first and second lugs to provide communication between said lugs, said interconnecting rib means being spaced apart from the surface plane of said structural member from which said lugs project to define an interconnecting passageway, such spacing being sufficient to allow said first end of said spring to pass continuously from the anchoring cavity of one of said lugs through said interconnecting passageway and into said anchoring cavity of the other lug.

* * * * *

UNITED STATES PATENT AND TRADEMARK OFFICE
CERTIFICATE OF CORRECTION

PATENT NO. : 4,036,396
DATED : July 19, 1977
INVENTOR(S) : Richard T. Kennedy et al.

It is certified that error appears in the above-identified patent and that said Letters Patent are hereby corrected as shown below:

Column 2, line 47, "ditance" should read --distance--.

line 57, "arcrate" should read --arcuate--.

line 58, "acurate" should read --arcuate--.

Column 6, line 24, after "mounting" insert --means--.

Signed and Sealed this

Twenty-second Day of November 1977

[SEAL]

Attest:

RUTH C. MASON
Attesting Officer

LUTRELLE F. PARKER
Acting Commissioner of Patents and Trademarks